US008719180B2

(12) United States Patent
Biasi et al.

(10) Patent No.: US 8,719,180 B2
(45) Date of Patent: May 6, 2014

(54) DELIVERY POINT IDENTITY SERVICES

(75) Inventors: Theresa Biasi, Shelton, CT (US); Robert A. Cordery, Danbury, CT (US); Andrei Obrea, Seymour, CT (US); Leon A. Pintsov, West Hartford, CT (US); Frederick W. Ryan, Jr., Oxford, CT (US)

(73) Assignee: Pitney Bowes Inc., Stamford, CT (US)

( * ) Notice: Subject to any disclaimer, the term of this patent is extended or adjusted under 35 U.S.C. 154(b) by 3125 days.

(21) Appl. No.: 10/951,226

(22) Filed: Sep. 27, 2004

(65) Prior Publication Data

US 2006/0074978 A1 Apr. 6, 2006

(51) Int. Cl.

*G06Q 10/00* (2012.01)
*G06Q 30/00* (2012.01)
*G06F 17/00* (2006.01)

(52) U.S. Cl.

USPC .......................................... 705/330; 705/332

(58) Field of Classification Search

USPC ............................................ 705/1, 330, 332

See application file for complete search history.

(56) References Cited

U.S. PATENT DOCUMENTS

| | | | | |
|---|---|---|---|---|
| 5,520,326 | A | 5/1996 | Schmidt et al. | |
| 6,371,367 | B1 | 4/2002 | Otero | |
| 2003/0057270 | A1 * | 3/2003 | Collen | 235/375 |
| 2004/0117326 | A1 | 6/2004 | Amato | |
| 2006/0255912 | A1 * | 11/2006 | Simms et al. | 340/5.73 |

FOREIGN PATENT DOCUMENTS

| | | | |
|---|---|---|---|
| EP | 1640076 | A3 | 5/2006 |
| WO | 03/000435 | A | 1/2003 |

* cited by examiner

*Primary Examiner* — Kevin Flynn
*Assistant Examiner* — David J Clark
(74) *Attorney, Agent, or Firm* — Michael J. Cummings; Charles R. Malandra, Jr.; Steven J. Shapiro

(57) ABSTRACT

A method and system for providing services to a mail delivery point are presented. According to the method, a delivery point identifier is acquired from a device located at the delivery point. Then, delivery point data is accessed corresponding to the delivery point identifier, and mail delivery services are provided in response to the delivery point data. The delivery point data are modifiable by a recipient who receives physical mail at the delivery point, and the delivery point data includes recipient preferences.

16 Claims, 5 Drawing Sheets

DELIVERY POINT IDENTITY SERVICES

TECHNICAL FIELD

The present invention relates to mail delivery, and more specifically to customized mail delivery.

BACKGROUND OF THE INVENTION

The letters "zip" in "zip code" stand for Zone Improvement Plan, and zip codes were first implemented in 1963. A zip code identifies a specific geographic delivery area. Before zip codes were introduced, two-digit "zones" were used, and those zones represented a place in a city. The post office sorted mail first by state, then by city, then by zone, then by street address. With the coming of zip codes in 1963, three digits were added in front of the two-digit zones. Postal employees no longer needed to read the state and town when they had the five-digit zip codes. Increasingly, the postal service moved to mechanized reading and sorting. Often, mail in the United States now includes a bar code which contains zip code information to aid in this mechanized process.

In 1983, the "zip plus four" concept was introduced. The basic five-digit zip code remains, but a very specific four-digit number is added, again to help with mechanized reading and sorting. Sometimes the four digits stand for a city block, a specific building, or even—in a high rise apartment or office—a few floors. The average American does not use the "plus four" zip code, but it is required for bulk mailings. Use of the 4-digit add-on helps the postal service route mail more efficiently and accurately because it reduces handling, and significantly decreases the potential for human error and possibility of misdirected delivery; it also leads to better control over USPS costs and, in turn, postage rate stability. zip+4 is intended for use primarily by business mailers who prepare their mail with typewritten, machine-printed, or computerized addressing formats that can be read by the Postal Service's automated scanners during processing. The postal service has a zip+4 look-up system on its Internet server, in order to avail the public of a simple means of obtaining zip+4 code information.

The zip code is often translated into a barcode called POSTNET, that is printed on the mailpiece, to make it easier for automated machines to sort the mail. Unlike most barcode symbologies, POSTNET uses long and short bars, rather than thin and thick bars. The barcode can be printed by the person who sends the mail, or the post office can affix the barcode when the postal service receives the mail piece. If the postal service affixes the barcode, the destination address is determined using either optical character recognition (OCR), or a human reads the address if absolutely necessary.

People who send bulk mail can get a discount on postage if they have pre-printed the barcode themselves. An additional two digits are usually used to indicate the exact "delivery point" (DP), so that every single mailable point in the country should have its own 11-digit number. These two digits are usually the last two of the street address or box number, though non-numeric points with names or letters are assigned DP numbers by the local post office. A last digit can be used as a check digit, obtained by adding up the 5-, 9-, or 11-digits, and then subtracting the last digit of that result from 10 (e.g. the check digit for 10001-0001 00 would be 7). The sender needs only to type something like "100010001007" using POSTNET to create the code for printing.

When the owner of a mailbox or other mail delivery point wants to leave specific instructions for a mail delivery, a cumbersome process is usually needed. The owner must go to the post office and fill out forms, which then must be read and entered into a computer. Due to the cumbersome nature of this process, only a limited number of the most essential services are available in this way, including a change of address. Some of those services would be even much more cumbersome than the change of address process, because it can be difficult for a busy delivery person to be adequately informed that a user at a particular delivery point is requesting a particular service (such as obtaining signatures from a neighbor).

SUMMARY OF THE INVENTION

The present invention presents a method and system of providing services for a mail delivery point that enables a delivery person and delivery company (e.g. including the United States Postal Service) to efficiently provide a wide range of mail-related services customized to meet a mail recipient's preferences.

According to one aspect of this method, a delivery point identifier is acquired from a device located at the delivery point. Then, the delivery point identifier is used to access corresponding delivery point data, and mail delivery services are provided in response to the delivery point data. The delivery point data are modifiable by a recipient who receives physical mail at the delivery point, and the delivery point data includes recipient preferences and/or publicly available data. This delivery point data is indicative or suggestive of the recipient's preferences related either to mail or to procedures for mail delivery. For example, the recipient preferences that are included in the delivery point data, are preferences like delivery instructions, mail preferences, topic interests, a characteristic of the recipient's property, or requests for notification (upon delivery).

The mail recipient is able to modify the delivery point data, for example via a password-protected Internet site corresponding to the delivery point. The delivery point data is then provided from the delivery point Internet site (DPIS) to a delivery person memory unit (DPMU) that subsequently accompanies the delivery person on his or her route.

The device that is located at the delivery point, and that provides the delivery point identifier (DPI), may be a tag affixed to the mail delivery point (e.g. a barcode or radio frequency identification tag), or it may be a global positioning device that automatically deduces the DPI based upon location (both types of device can be used so that the tag provides a backup if the GPS system does not yield the DPI). If a tag is used, then some or all of the delivery point data can be accessible from the tag instead of from an Internet site or from a delivery person memory unit (DPMU), but alternatively the tag may merely provide the DPI. If the tag does provide some or all of the delivery point data, then that data can be encrypted for purposes of privacy protection.

If a delivery point Internet site (DPIS) is used, this site can be provided by a private company that satisfies postal service standards and protocols, or it can be provided directly by the postal service. Especially if provided by a private company, a DPIS site can additionally enable the recipient to access received email, voice mail, faxes, or other data. For example, voice mail received by a telephone company for the recipient's phone number can be converted to a digital email attachment and sent for posting at the DPIS. In this way, the DPIS can become a centralized communication tool for the recipient. The term DPIS potentially refers to any automatically accessible source of DPD; the DPIS will preferably be on a secured network or via a secure connection, and delivery person access may be through a private network.

According to another aspect of the present invention, the method of providing services for a mail delivery point includes accessing delivery point data from a device located at the delivery point, and providing services that are at least partly in response to the delivery point data. In this embodiment, the device is affixed to the delivery point, but the device is replaceable or modifiable so that the delivery point data reflects new or updated information regarding the services. A radio frequency identification tag may be the device that provides the delivery point identifier at the delivery point.

A system according to an embodiment of the present invention includes a device located at a delivery point, for providing the delivery point identifier, and a delivery person memory unit (DPMU) for providing to a delivery person delivery point data corresponding to the delivery point identifier. The system may also advantageously include a delivery point Internet site, for accepting new or revised delivery point data from a recipient associated with the delivery point, and for sending the new or revised delivery point data toward the delivery person memory unit (DPMU).

BEST MODE FOR CARRYING OUT THE INVENTION

Figure 1:
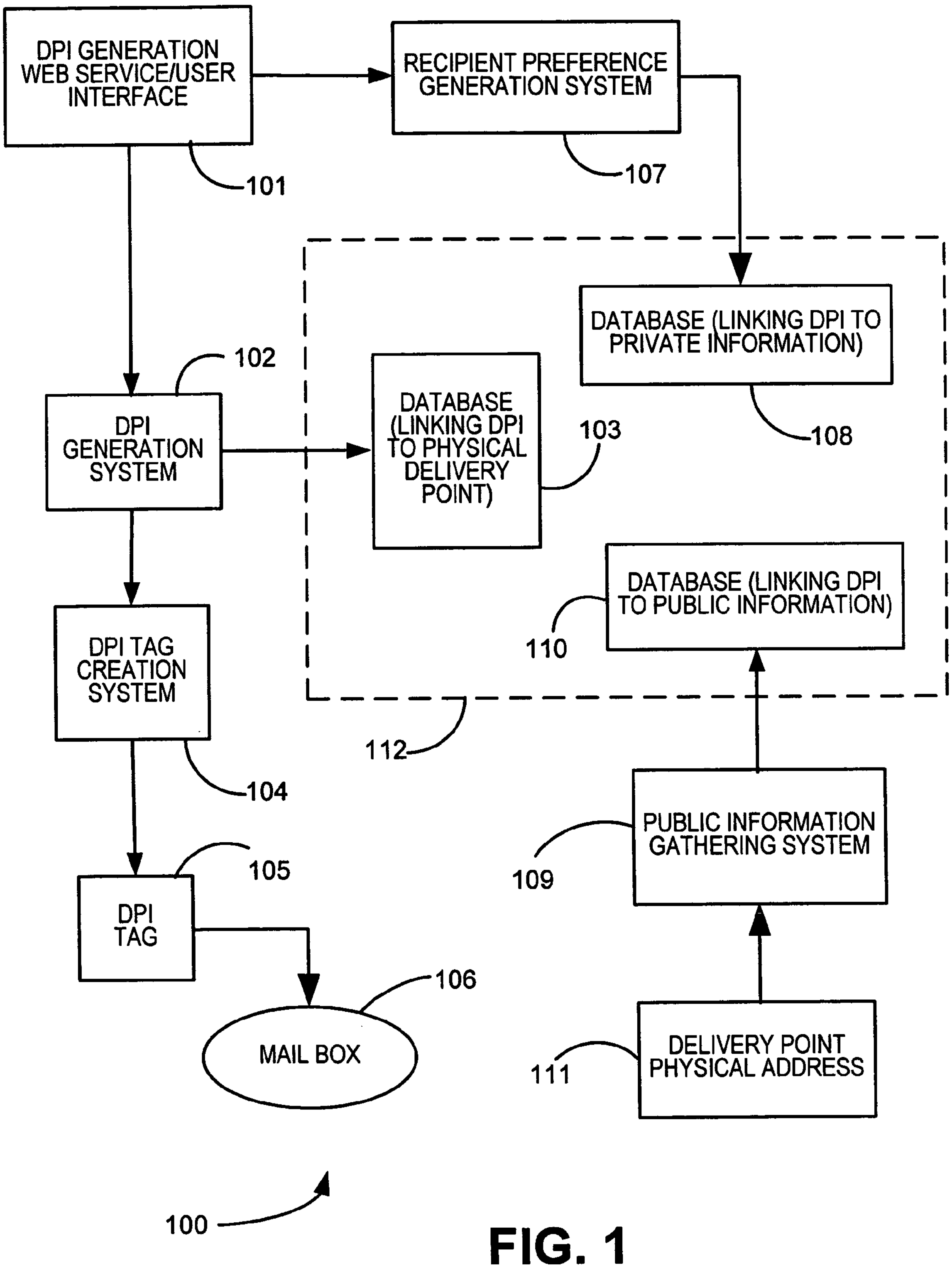
FIG. 1 shows an initial setup method for a system linking a delivery point identifier to a database containing mail-related preferences of a recipient.

A device such as a delivery point identifier (DPI) tag is physically affixed at a delivery point. The device can be a printed bar code, character string, or other passive identifier. Also, the device can alternatively be a radio frequency identification (RFID) tag that is affixed to a mailbox. The tag can include the DPI in a format that can be perceived only by machines and/or in a format that humans can perceive. A delivery person, such as a postal service employee, interacts with the tag in order to obtain the DPI, and then the delivery person uses the DPI obtained from the tag in order to access, for example, an Internet site from which delivery point data (DPD) for the delivery point is obtained. This Internet site, called hereinafter a "Delivery Point Internet Site" (DPIS), can be a web site or web page (or a portion or set thereof) that is associated with each delivery point. The delivery person thereby obtains DPD, including recipient preferences (RP). The recipient preferences (RP) are preferences entered by a person who receives items at the delivery point (i.e. entered by the "recipient" such as an owner of a mailbox at the delivery point). When a person sells his or her house, for example, the "recipient" at that delivery point would normally change from the old owner to the new owner.

Instead of a DPI tag being affixed to the delivery point, it is also possible for the device to be a global positioning device. This GPS device indicates or facilitates determination of the DPI, when the device is located at the delivery point (i.e. in proximity to each delivery point within a certain maximum distance from that delivery point)

Some (or all) of the DPD can be available directly from the tag, without having to access a DPIS. Whether or not the DPD is entirely available directly from the tag, or instead is also available via the DPIS, the DPD can be stored in a delivery person memory unit (DPMU) which accompanies the delivery person, so that the delivery person can recover the DPD from the DPMU upon learning the DPI from the DPI tag, without always having to obtain the DPD from the Internet and/or from the DPI tag. The DPMU can be automatically updated nightly with the DPD for each DPI on the carrier's route, for example, by automatically accessing the information at each DPIS. Alternatively, the DPMU can be updated in real time (e.g. via wireless networking technology).

In addition to disclosing a method for a delivery person to obtain the DPI, the present invention also discloses how a mail recipient can create and/or modify either the DPI tag or the DPD or both. Thus, the recipient can conveniently change the instructions for delivery of mail.

Within the DPD, the recipient preferences (RP) would optionally be accompanied by publicly available data (PAD) that need not be provided by the recipient. The PAD can be gathered from public sources without the recipient's participation. In other words, the following simple relationship would be applicable:

$$DPD=RP|PAD.$$

Here, the vertical line "|" signifies concatenation of the information, meaning not that the RP must come before the PAD, but rather that the RP and PAD is combined together while preferably still remaining distinct. Although the PAD could be acquired without involvement of the recipient, still the recipient can instruct that certain types of PAD not be added to the DPD, that certain types of PAD be added to the DPD, and/or can instruct that PAD not be added to the DPD without the recipient's confirmation and/or approval. Thus, in this embodiment, the recipient would be in control of the DPD. Even if a recipient approves of adding no PAD to the DPD, still the recipient can find it useful to learn what types of data about the recipient are publicly available for potential inclusion in the PAD, and to learn from whence that data came. Items not approved by the recipient for inclusion in the PAD can be stored in a secure unapproved data memory (SUDM) which the recipient can access and browse, and the recipient can transfer items between the SUDM and the PAD whenever the recipient chooses to do so.

It is advantageous for at least some of the recipient preferences (RP) to have privacy protection, so that some or all of the RP cannot be accessed by any arbitrary member of the public. Different levels of privacy protection can be applied to different parts of the recipient preferences (RP), and privacy protection can even be applied to the PAD too, if the recipient wants to limit the further availability of data that has already entered the public domain. This privacy protection is achievable, for example, by ensuring that the recipients and the authorized delivery personnel share the DPD via an Internet web site (DPIS) that is secure and password-protected. The recipient would have control of the recipient-specific content of the DPIS, but would not necessarily have control of the DPIS format.

In alternative embodiments, in which at least some of the DPD is available directly from the DPI tag, delivery personnel can be equipped with scanners or other devices that can decrypt information that is encrypted on the DPI tag. These devices can be the same devices needed to receive the DPI from the DPI tag. The word "scan" is used in this application broadly, so as to include any kind of interaction with the DPI tag that enables the delivery person to receive the DPI and/or DPD from the DPI tag. For example, if the DPI tag is in the form of an RFID tag, then it is possible for equipment accompanying the delivery person to automatically sense the DPI from the DPI tag, and to automatically access the DPIS or DPMU, without a delivery person doing anything differently from what a delivery person has normally done in the past. Information from the DPIS or DPMU can even be automatically conveyed to the delivery person via an audio device, so that the delivery person will not necessarily have to look at a display screen. Of course, it is to be understood that the DPIS as presented to the recipient will not necessarily be identical to the DPIS as presented to the delivery person, and the information in the DPIS can be accessed in different ways by the recipient and the delivery person (e.g. using two different URLs).

The recipient preferences (RP) would include, for example, delivery preferences, such as a temporary redirection, or a preferred day-of-the week for delivery. A temporary redirection would be a temporary change of address, or temporary instructions to leave large packages with a neighbor, or temporary instructions to allow a neighbor to sign for packages that require a signature, or temporary instructions to leave particular types or pieces of mail at other locations near the delivery point. The day-of-the week for delivery would simply mean that the delivery person would be asked to not deliver an item or type of item on a particular day, but instead should come back and make the delivery another day.

Thus, some recipient preferences (RP) would typically be temporary, while some would be more permanent. The recipient would be able to adjust or correct all of this delivery point data (DPD), for example by accessing the secure Internet site (DPIS) where at least some of this DPD is stored.

If DPD is stored at the DPIS, the delivery person would not necessarily have to access that secure site every time the delivery person visits the delivery point. For example, if the DPD for a DPI remains unchanged, then the delivery person can simply use the DPD previously accessed and stored in the DPMU. The recipient can leave an indicator whenever the DPD is changed, for example by changing the position of the DPI tag. Alternatively, the delivery person's stored DPD for each DPI can be automatically updated each night by accessing the respective secure Internet sites (or accessing a server that hosts those sites), so that the delivery person would not have to access the secure Internet site DPIS when visiting a delivery point even if the DPD for that DPI has changed since the previous visit. Thus, the delivery person would only have occasion to directly access the DPIS if the delivery person encounters a new building or the like having a new DPI; and even then, the delivery person could instead simply store the new DPI so that the DPD for that DPI would be automatically accessed and stored that night (i.e. the delivery person would not begin utilizing the DPD for a new DPI until a day or more after first encountering that new DPI).

It should be borne in mind that it may be useful for the delivery person to scan the DPI tag even if the DPD has not been changed, so that the delivery person can quickly access the correct DPD that the delivery person previously accessed and stored in the DPMU for that DPI. Scanning the DPI tag is also potentially useful in order to provide automatic verification that the delivery person has made a delivery at particular space-time coordinates (e.g. date, time, and GPS information), for example so that notifications can automatically be sent to the recipient and/or to senders.

There are many other types of recipient preferences (RP) in addition to the delivery preferences already discussed. For example, if a person sometimes places outgoing mail in the mailbox, the RP can specify that the user wants the delivery person to affix appropriate postage and charge the recipient's credit card.

The RP may also include the recipient's topic interests, so that the delivery person can select appropriate mass mailings for each mailbox. An efficient use of the recipients' topic interests would be for the delivery person's employer (e.g. postal service) to provide direct marketers with the number of recipients in a particular zip code (or delivery route) having a particular topic interest, and then a direct marketer would provide the postal service with a corresponding number of mail items for that particular zip code (or delivery route), and then the postal service would address those mail items to the particular recipients without divulging the identities of those recipients to the direct marketers. In this way, recipients can maintain their privacy, recipients can easily modify their topic interests in order to stop unwanted mail, and the postal service or other delivery company can generate an income stream from direct marketers. The information supplied to the marketers can be of controlled granularity (e.g. by nation, by state, by postal bulk mail facility, or by zip code). The RP can also include specific topics that do not interest the recipient so that mailings regarding those topics can be withheld from the delivery point; businesses could be required to mark their mailings with a code indicative of topic, for ease of topic identification by the postal service.

Thus, a type of recipient preferences (RP) would be mail preferences, such as categories of mail to discard, as well as specific senders (or DPI's) whose mail should be discarded, or returned to sender. Mail preferences can further include a request that certain mail or types of mail be instead electronically emailed to the recipient, or posted at the secure web site DPIS corresponding to the recipient's DPI, whenever the sender has indicated a capability to do so; such electronic mailings can be sent via the postal service or other delivery company so that the sender will not get the recipient's email address or other electronic contact information.

A further type of recipient preferences (RP) would be a characteristic of any property of the recipient, which may include personal acquisitions such as type of car, number of phones, type of cable service, and the like. This type of RP would be similar to the topic interests already discussed, but at a more abstract level that would allow direct marketers to deduce likely topic interests. Similarly, the RP can include other non-public property characteristics related to the physical delivery address, such as type of heating system, appliances, age of carpeting, age of children, and various demographic information.

The recipient preferences (RP) can additionally include delivery notification preferences, such as secondary notification information. For instance, the RP may include the mail piece identification of a particular item that the recipient is expecting. The RP can include one or more methods of notification either for a particular mail piece, or for a particular type of mail piece, for all mail pieces, or for some combination thereof—the alternative methods of notification would be email, telephone, doorbell, or the like.

Regarding the publicly available data (PAD), public information can be obtained from public records, or visually by driving by a delivery point, or even by aerial observation. Useful types of PAD could include whether the delivery point corresponds to a house, apartment, condominium, business or other type of building. Likewise, the PAD can include physical characteristics of the building, such as number of rooms, property area, type of outer walls, and number of stories.

The recipient preferences (RP) can specify that items received from all surface mail senders (or some of them)

should preferably be via email, and then the email could be made available to the recipient by accessing the DPIS, or alternatively this incoming email could instead be made available to the recipient by sending it to any email address specified by the recipient. Thus, each DPI would not only correspond to a delivery point Internet site (DPIS) but would also correspond to a delivery point email address (DPEA) that accommodates at least incoming email. The recipient could be allowed to set up (and thereafter modify) at least one alias email address that forwards all incoming email to the DPEA, and thus the recipient would be able to give out that alias email address without giving out the recipient's physical location. The alias email address could optionally be used by the recipient for outgoing email also. In this way, the DPIS becomes a convenient and centralized tool for managing various types of communication to and from a delivery point, or to and from the people associated with a delivery point.

The present invention is further applicable when a telephone company accepts voice mail, paging messages, and/or faxes for a recipient who does not answer his or her phone. Any of these telephonic communications can be converted into an email or email attachment. This way, when the recipient accesses the DPIS, the user will be able to conveniently access voice mail, paging messages, and faxes, in addition to email, while also using the DPIS for managing surface mail, sending email, and finding out about incoming surface mail (information about incoming surface mail can include the sender DPI and at least one time when the mail piece was detected by the postal service). When a recipient telephonically accesses a telephonic communication recorded by the telephone company, then the telephone company can send an alert causing the DPIS to move that communication from a new to old category, so that the recipient will be able to avoid accessing the communication a second time via the DPIS if it was already accessed a first time via telephone (a converse alert can be sent to the telephone company if the recipient first accesses the communication via the DPIS).

All items incoming to the DPIS can be controlled and screened by the user in a way similar to the way the user would control surface mail using the recipient preferences ("surface mail" being mail of the traditional postal variety). The recipient preferences (RP) can also specify that at least some incoming surface mail should be scanned and posted at the DPIS (e.g. while the recipient is away from home), in return for a fee to the postal service.

It is to be emphasized that each DPIS can be set up and maintained by any private company alongside the postal service, and such a private company would then communicates with the postal service as information needs to be exchanged. Thus, although each DPIS would provide a handy centralized communication management tool for each delivery point, the totality of DPIS's need not be under central control. Nevertheless, it would be useful to develop standardized protocols, minimum requirements, and permits for such private companies to participate in this system. Also, the postal service itself could maintain the DPIS of each recipient who prefers not to hire a private company.

The DPI will normally stay the same when ownership or control of a building changes. The DPI would, for example, be an alphanumeric code, and would be accompanied by another code (e.g. password) in order to access the respective secure Internet site DPIS. This would be analogous to the typical combination of username and password that is normally used to access secure Internet resources. Information at the DPIS could be made available to third parties for a fee with the recipient's approval, and that information would of course be on a read-only basis.

The present invention can be used to provide a variety of supplementary or value-added services. Those services can be offered to the recipient, to senders, or to both.

For the recipient, advance information can be provided about a delivery, so that the recipient can access the secure Internet site (DPIS) corresponding to the DPI in order to find out about incoming letters or packages that are marked with the recipient's DPI. The recipient can thus obtain notice that a package is coming, plus information about when and where it will be delivered, the phone/email/fax number of the sender, the chain of custody from sender to recipient, and/or the delivery network used. Such incoming mail information (IMI) could also include, for example, the identity of a sender, and the urgency of the delivery. This IMI could be provided directly to the recipient, and/or it could be automatically provided to the postal service or other delivery company so that they can immediately begin to comply with the recipient preferences (RP). The recipient could use this IMI information to exercise control of delivery, for example by paying an extra charge to speed up delivery, paying an extra charge for delivery in a particular time window, or receiving a payment if the recipient wants to slow delivery down. The IMI could also be used to reject certain types of mail such as standard (STD) class mail, long before the mail arrives in the state or city where the recipient is located. The IMI would also provide an efficient way to utilize the RP for rejecting mail from specific senders, or for specified sources or topics (or some senders can be allowed only if they wish to communicate regarding a particular topic). The IMI would allow the RP to cause rerouting, auto-forwarding, and/or delivery to a specific pick-up location such as a private delivery company store.

The recipient preferences (RP) could also be used to influence future delivery, by causing the postal service to automatically notify types of senders or specific senders to put the recipient on a "not interested" or an "interested" list, with or without providing to senders further information.

The recipient preferences (RP) can furthermore specify what to do with international mail having customs requirements. For example, the RP can specify that any customs fee should be automatically charged to the user's credit card, as long as the customs fee does not exceed a certain amount, and as long as the recipient has not already paid a certain amount of customs fees during a recent period of time (e.g. during the past week).

As mentioned, the present invention can be used to provide a variety of supplementary or value-added services to senders as well. To the extent that a recipient allows his or her RP (and/or PAD) to be publicly available, senders would potentially be able to request information about specific addresses, and/or request addresses with specific characteristics. Senders would also be able to request notification and/or confirmation of delivery to a recipient's mailbox, and the sender's DPIS can indicate how that sender should be notified to confirm delivery and/or to notify the sender that the user is returning merchandise.

When a recipient receives a bill, the return envelope can indicate the DPI of the company requesting payment. Thus, the DPIS of the company requesting payment can indicate that the company should be notified as soon as the return envelope is scanned after being mailed subsequent to a certain date. This enables the company requesting payment to prevent such things as sending unnecessary repeat bills to a customer.

Likewise, suppose a person is buying an item from a company by mail. The person can send an envelope indicating the company's DPI and also indicating a code for any items being purchased. Thus, the DPIS of the company can indicate that the company should be notified as soon as the envelope is scanned after being mailed, and this will allow the company to begin pulling the item from inventory before payment is received.

Senders to a DPI will be able to easily find out if the recipient has requested that the postal service forward mail to a location that would cause the sender to refrain from sending an item. For example, a local theatre advertising a play would refrain from sending information to a nearby DPI if the corresponding DPIS of the recipient indicates a forwarding address far away.

When a person having control of a DPI transfers control of the delivery point to someone else (e.g. due to sale of a home), the uniform resource locator (URL) for the DPIS corresponding to that DPI would preferably remain the same, but the password would preferably change. For example, the first owner deletes all personal information from the DPIS, then tells the second owner the password, and then the second owner changes the password. The DPIS may or may not include forwarding information for the first owner, at the discretion of the second owner (of course the first owner can also submit a change of address to the postal service as is currently done).

Turning now to the figures, FIG. 1 shows an embodiment of the invention in which a system is initially set up in order to link a delivery point identifier to a database containing mail-related preferences of a recipient. This method 100 creates a system to assign a unique identifier to any physical delivery point, generating and applying a machine-readable tag. Either the postal service or the owner of a mailbox uses the DPI Generation Web Service/User Interface 101 to enable a DPI generation system 102 to create a DPI for the mailbox, and this DPI need not necessarily be the same as other delivery point numbers for the delivery point (e.g. the DPI need not be the same as the 12-digit POSTNET code). The owner of the mailbox would also enter the postal address of the physical delivery point. Incidentally, mailboxes can come with DPIs already applied by a manufacturer, in which case the user enters that DPI into the system 102, and enters the address of the physical location. The DPI generation system 102 then creates the unique DPI for that delivery point, and stores it in a database 103 linking the DPI to the physical delivery point postal address. The DPI generation system 102 also sends the DPI information to a tag creation system 104, which then creates the tag 105 (e.g. a printed tag, an RFID tag, or any other machine-readable type of tag). This tag is then applied to the mailbox 106. The owner of the mailbox then uses the DPI Generation Web Service/User Interface 101 to access a Recipient Preference Generation System 107 for entering recipient preferences (RP). These private RP are then added to the database 108 which links the DPI to the RP. Additionally, a Public Information Gathering System 109 either manually or automatically gathers publicly available information about the Delivery Point Physical Address 111, and enters this publicly available data (PAD) into the database 110 which links the DPI to the PAD. All of the databases 112 can be separate or combined into one. These databases may be wholly or partially resident on the tag, a server, or a combination of the two.

Figure 2:
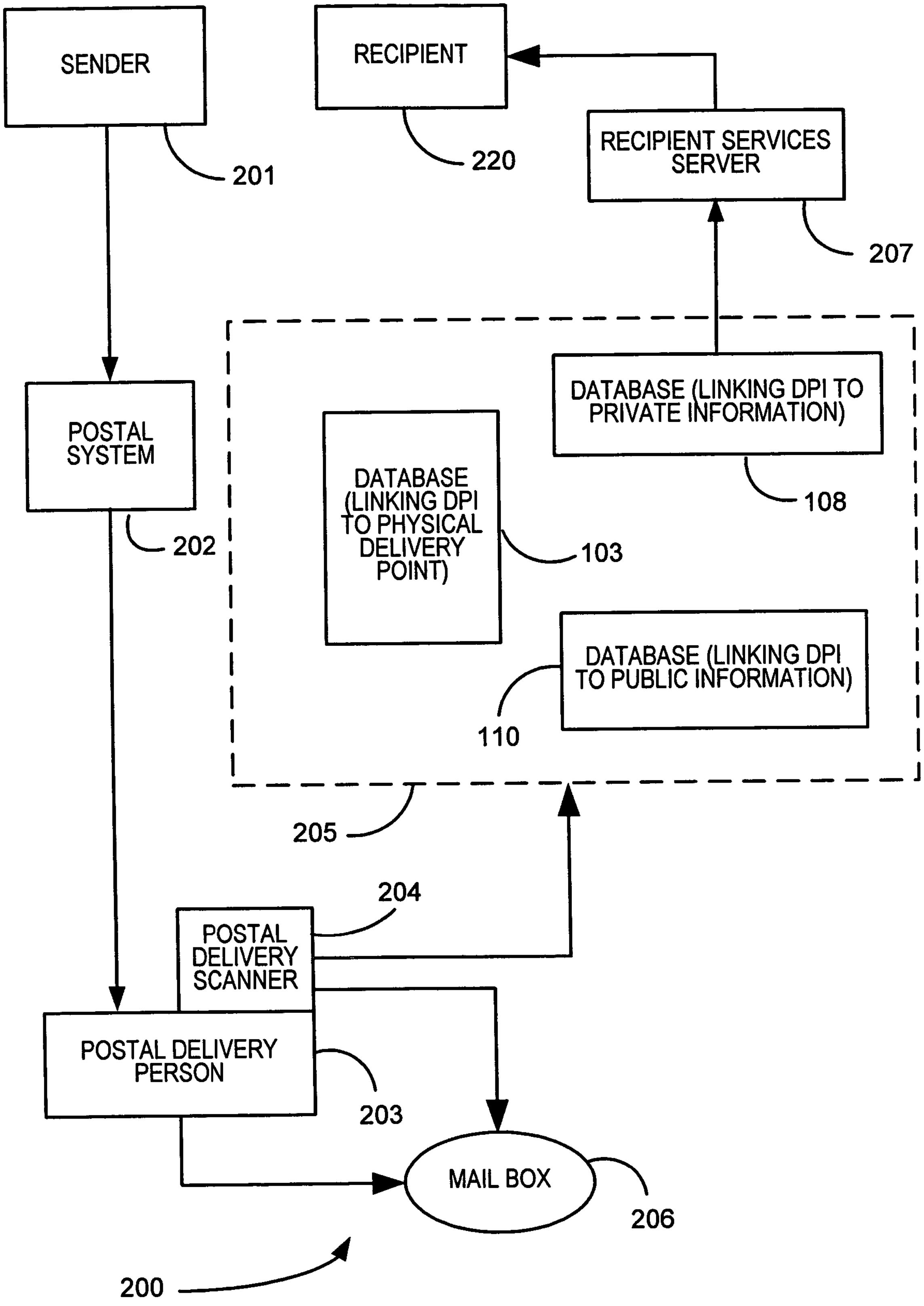
FIG. 2 shows use of the system already set up according to FIG. 1.

Turning now to FIG. 2, this shows a method 200 using the system already set up according to FIG. 1. The sender 201 creates a mail piece (no special markings are required on the mail piece), and this mail piece enters the postal system 202 for normal processing. A postal delivery person 203 brings the mail piece to a physical delivery location such as a mailbox 206. The postal delivery person uses a scanner 204 to read the DPI, and the scanner links to the database 205 in order to access recipient preferences. The postal delivery person then delivers mail, and/or refrains from delivering mail, in the manner prescribed by the recipient preferences (RP). If the recipient preferences (RP) include a preference for notification, then a Recipient Services Server 207 sends the appropriate notification to the recipient 220.

Figure 3:
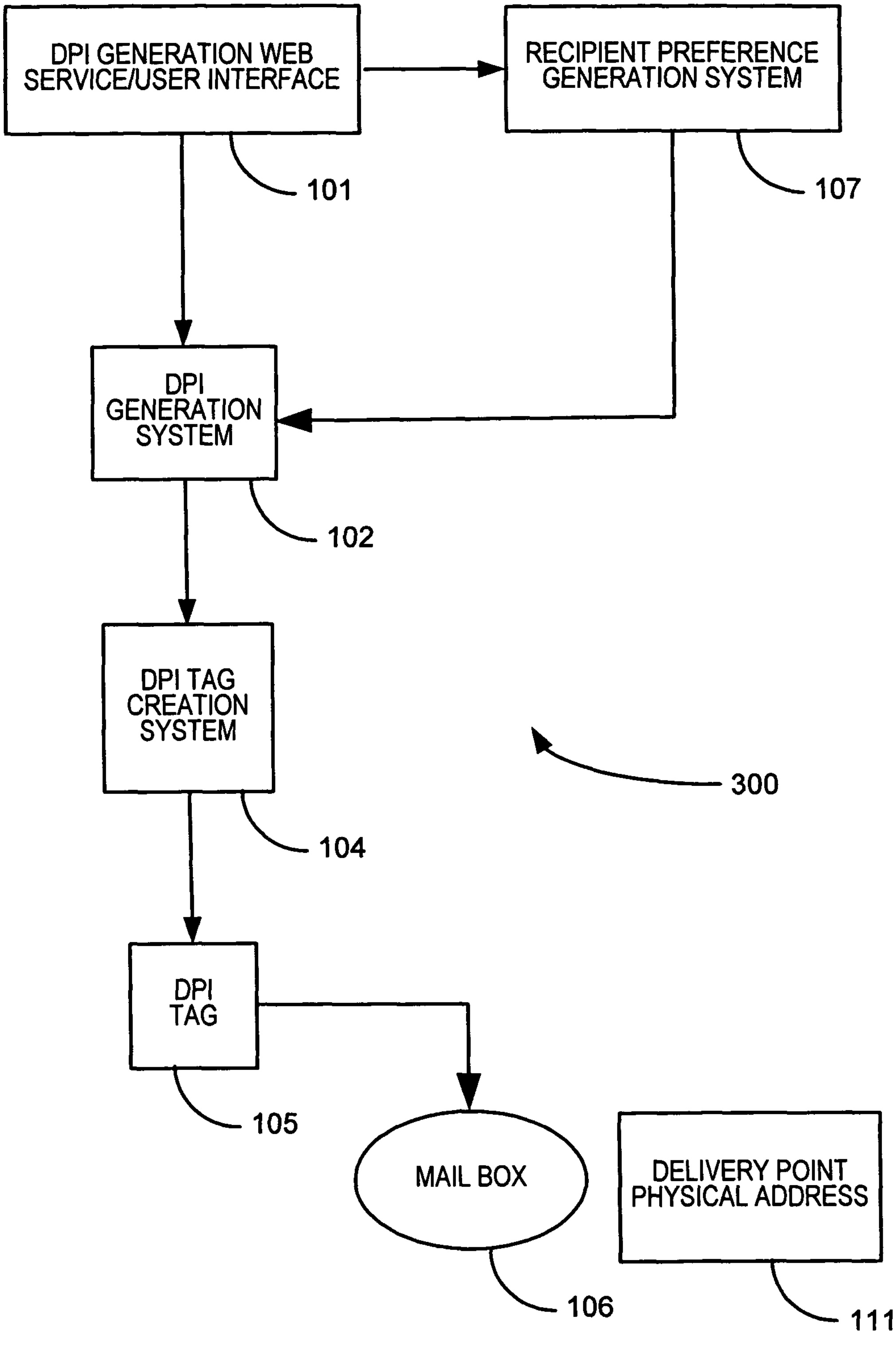
FIG. 3 shows an initial setup method for a system allowing a mail recipient to install mail-related preferences in a tag.

FIG. 3 shows an initial setup method for a system allowing a mail recipient to install mail-related preferences in a tag, without using a database of the kind shown in FIGS. 1 and 2. This method 300 creates a system to assign a unique identifier to any physical delivery point, generating and applying a machine-readable tag at that delivery point. Either the postal service or the owner of a mailbox uses the DPI Generation Web Service/User Interface 101 to enable a DPI generation system 102 to create a DPI for the mailbox. The owner of the mailbox enters the delivery point physical address 111. The owner of the mailbox also uses the DPI Generation Web Service/User Interface 101 to access a Recipient Preference Generation System 107 for entering recipient preferences (RP). The DPI generation system 102 then creates the unique DPI for that delivery point. The DPI generation system 102 sends the DPI information to a tag creation system 104, which then creates the tag (e.g. a printed tag, an RFID tag, or any other machine-readable type of tag), including encrypted information indicative of the recipient preferences entered by the mailbox owner. The tag is then applied to the mailbox 106.

Figure 4:
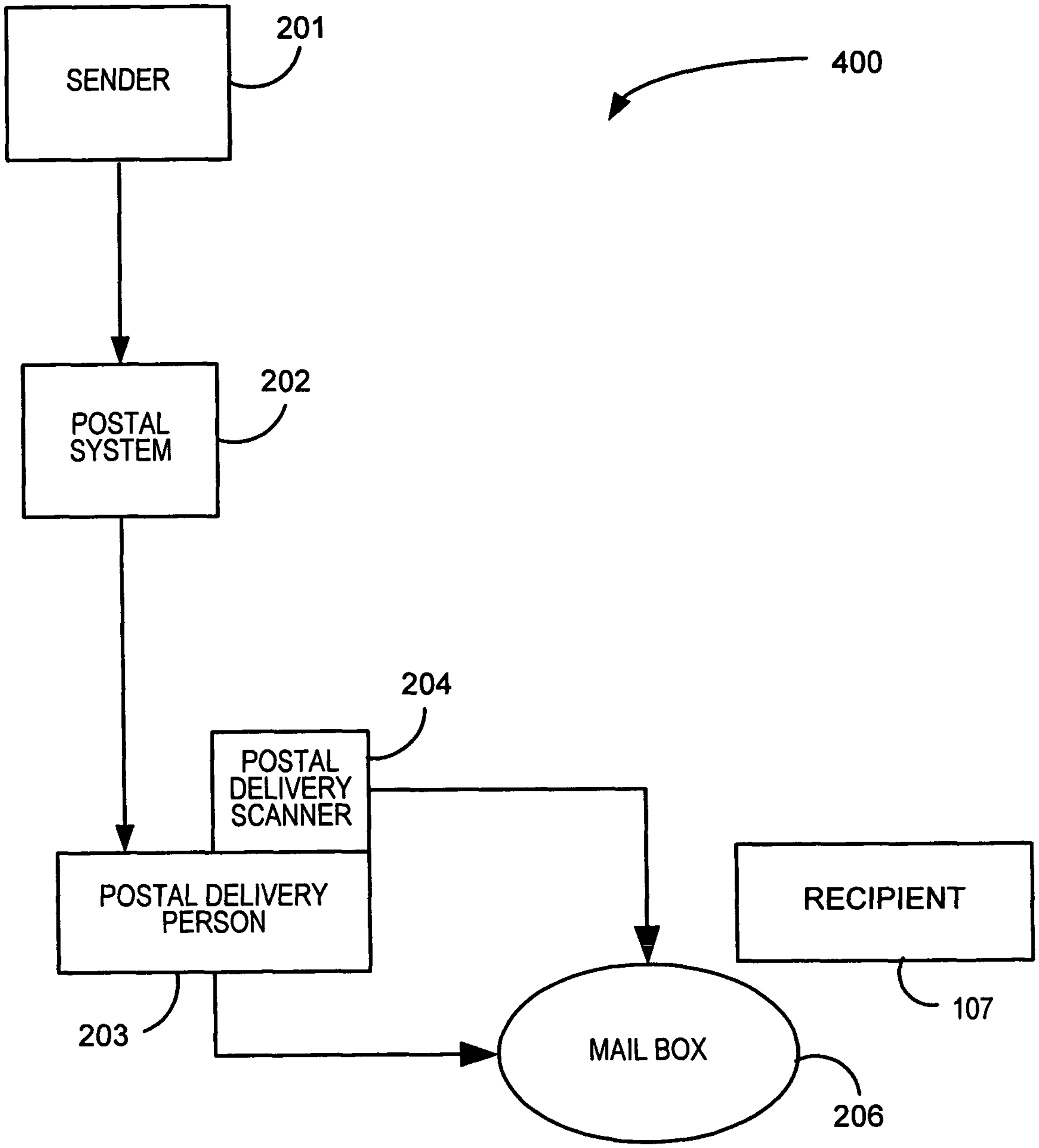
FIG. 4 shows use of the system already set up according to FIG. 3.

Turning now to the method 400 of FIG. 4, this shows use of the system already set up according to FIG. 3. The sender 201 creates a mail piece (no special markings are required on the mail piece), and this mail piece enters the postal system 202 for normal processing. A postal delivery person 203 brings the mail piece to a physical delivery location such as a mailbox 206. The postal delivery person uses a scanner 204 to read the DPI, and the scanner also decodes information regarding the recipient preferences. The postal delivery person then delivers mail, and/or refrains from delivering mail, in the manner prescribed by the recipient preferences (RP).

Figure 5:
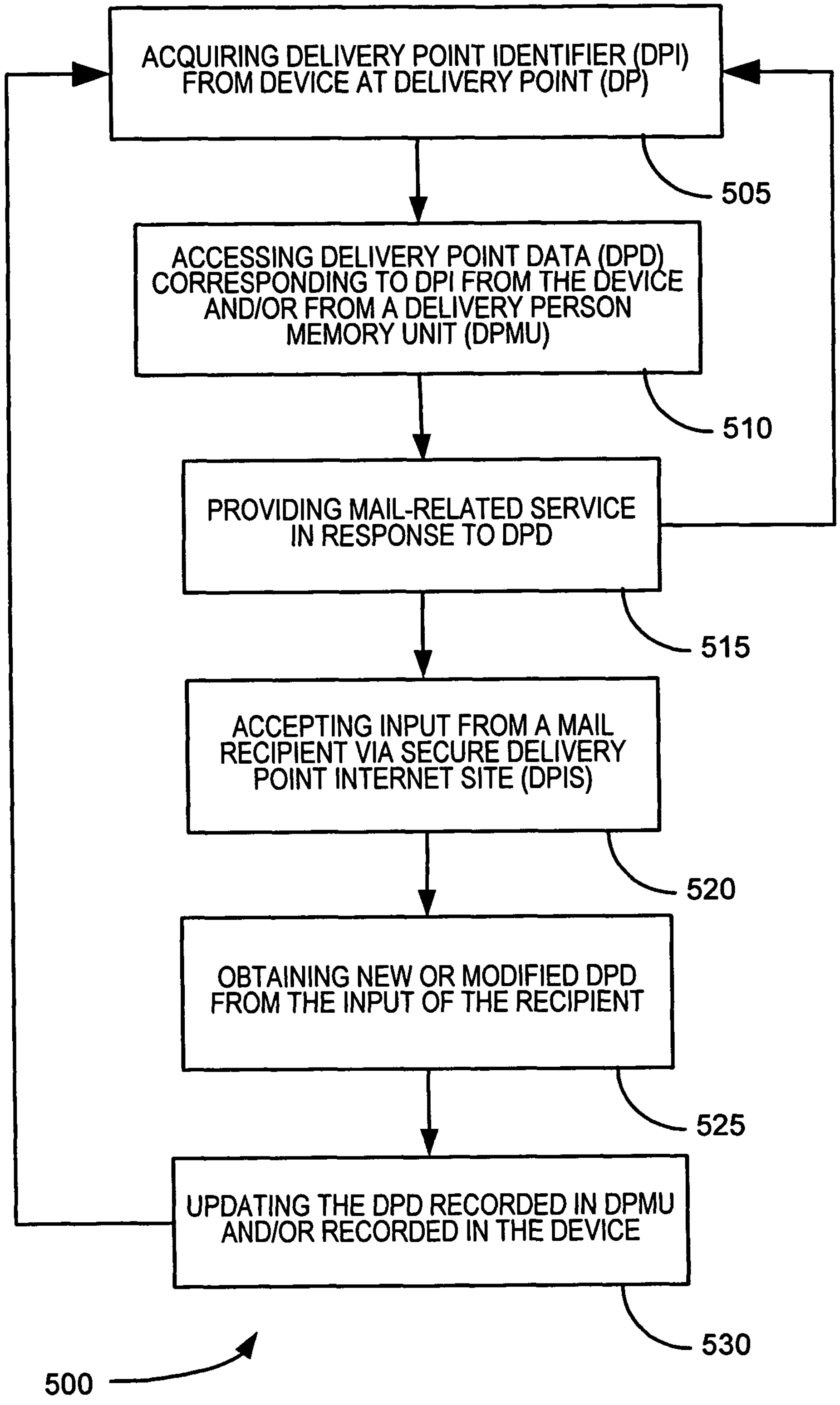
FIG. 5 shows a linear flow chart for repetitive use of the invention.

FIG. 5 is a simple flow chart illustrating yet another embodiment of the present invention. The initial step of this method 500 is acquiring 505 a delivery point identifier (DPI) from a device located at the delivery point. The device can, for example, be an RFID tag or a barcode affixed to the delivery point, or it can be a GPS unit that a delivery person takes to the delivery point. Then, delivery point data (DPD) is accessed 510 corresponding to the DPI, and this DPD is accessed either from the device and/or from a delivery person memory unit (DPMU) that accompanies the delivery person. The delivery person uses the DPD to provide 515 a mail-related service. Subsequently, input from a mail recipient is accepted 520 via a secure delivery point Internet site (DPIS), and new or modified DPD is obtained 525 from this input. This new or modified DPD is used to update 530 the DPD recorded in the DPMU and/or recorded in the device. This whole process then repeats, although steps 520, 525, and 530 can be omitted during an iteration if the DPD has not changed.

Of course, the present invention is entirely consistent with assigning DPIs to mobile delivery points, such as recreational vehicles (RVs) and the like, so that location becomes a variable attribute of the DPI. A person skilled in the art will perceive that DPIs can likewise be associated with individual people or groups of people, in contrast to associating a DPI with a structure or vehicle. Thus, a personal DPI could be acquired from a mailbox tag by scanning the tag, and then referring to the delivery person memory unit (DPMU) which correlates the scanned information to one or more personal DPI. So, a woman may have a DPI for her house, another DPI for her office, and potentially even an additional DPI corresponding to herself. Eventually, the fixed-location residential DPIS's can potentially be phased out, in favor of DPIS's corresponding to individual people. Of course, even without introducing any personal DPIs, the DPD for a fixed DPI can still include instructions and/or preferences specific for each person/entity who currently receives mail at that specified location.

It is to be understood that all of the present figures, and the accompanying narrative discussions of best mode embodiments, do not purport to be completely rigorous treatments of the methods and systems under consideration. A person skilled in the art will understand that the steps of the present application represent general cause-and-effect relationships that do not exclude intermediate interactions of various types, and will further understand that the various structures described in this application can be implemented by a variety of different combinations of hardware and software, and in various configurations which need not be further elaborated herein.

What is claimed is:

1. A method of providing services for a mail delivery point, comprising:

acquiring a delivery point identifier, comprising a unique identifier for the mail delivery point, from a tag affixed to the mail delivery point;

accessing in a database on a processing device delivery point data corresponding to the delivery point identifier, wherein the delivery point data comprises mail-related preferences of a recipient; and providing at least one service that is at least partly in response to the delivery point data;

wherein the delivery point data is at least partly modifiable by a recipient who is able to receive physical mail at the delivery point;

wherein a portion of the delivery point data is modifiable by the recipient via an Internet site;

wherein a delivery service obtains at least part of the portion of the delivery point data via the Internet site.

2. The method of claim 1, wherein the mail-related preferences of the recipient are related to at least one procedure for mail delivery.

3. The method of claim 1, wherein the at least part of the portion of the delivery point data is made available during the step of accessing the delivery point data.

4. The method of claim 3, wherein the at least part of the portion of the delivery point data is made available via a delivery person memory unit that accompanies the delivery person when the delivery person visits the delivery point.

5. The method of claim 4, wherein the delivery person memory unit is updated prior to when the delivery person begins deliveries, using information communicated from the recipient via the Internet site.

6. The method of claim 1, wherein the Internet site corresponds to the delivery point, and wherein this delivery point Internet site is password protected.

7. The method of claim 1, wherein the delivery point data is at least partly accessible from the device.

8. The method of claim 1, wherein information accessible from the tag is at least partly encrypted.

9. The method of claim 1, wherein the delivery point data includes publicly available data.

10. The method of claim 6, wherein the delivery point Internet site also enables the recipient to access received email, voice mail, faxes, or other data.

11. The method of claim 1, wherein the tag comprises a radio frequency identification tag, and wherein acquiring the delivery point identifier and accessing the delivery point data are carried out by receiving a radio frequency signal.

12. The method of claim 2, wherein the recipient preferences include at least one preference from the group consisting of: delivery preferences, mail preferences, topic interests, a characteristic of any property of the recipient, delivery notification, and preferences of another person who shares the delivery point identifier.

13. The method of claim 1, wherein the tag is a global positioning device.

14. The method of claim 12, further comprising using the delivery point data to control mail provided for delivery to the delivery point.

15. The method of claim 1, wherein accessing the delivery point data comprises referring to a memory unit that stores data from the database.

16. A system comprising:

a device located at a delivery point for providing a delivery point identifier, comprising a unique identifier for the mail delivery point;

a delivery person memory unit for providing to a delivery person delivery point data corresponding to the delivery point identifier, wherein the delivery point data comprises mail-related preferences of a recipient; and a delivery point Internet site, for accepting new or revised delivery point data from a recipient associated with the delivery point, and for sending the new or revised delivery point data toward the delivery person memory unit.

* * * * *